(12) United States Patent
Shi et al.

(10) Patent No.: US 12,375,583 B2
(45) Date of Patent: Jul. 29, 2025

(54) SCHEDULING METHOD AND APPARATUS, STORAGE MEDIUM AND ELECTRONIC DEVICE FOR CONTENT DELIVERY NETWORK

(71) Applicant: Beijing Youzhuju Network Technology Co., Ltd., Beijing (CN)

(72) Inventors: Chunman Shi, Beijing (CN); Jian Wang, Beijing (CN)

(73) Assignee: BEIJING YOUZHUJU NETWORK TECHNOLOGY CO, LTD., Beijing (CN)

( * ) Notice: Subject to any disclaimer, the term of this patent is extended or adjusted under 35 U.S.C. 154(b) by 0 days.

(21) Appl. No.: 18/893,622

(22) Filed: Sep. 23, 2024

(65) Prior Publication Data

US 2025/0016248 A1    Jan. 9, 2025

Related U.S. Application Data

(63) Continuation of application No. PCT/CN2023/082353, filed on Mar. 17, 2023.

(30) Foreign Application Priority Data

Mar. 22, 2022 (CN) .......................... 202210287989.3

(51) Int. Cl.
*H04L 67/60* (2022.01)
*G06F 16/957* (2019.01)
(Continued)

(52) U.S. Cl.
CPC .......... *H04L 67/60* (2022.05); *G06F 16/9574* (2019.01); *H04L 47/125* (2013.01); *H04L 61/25* (2013.01)

(58) Field of Classification Search
CPC ............................. H04L 47/125; H04L 67/25
See application file for complete search history.

(56) References Cited

U.S. PATENT DOCUMENTS 8,554,790 B2    10/2013 Turk
10,261,938 B1 *   4/2019 Jenkins ............... G06F 16/9574
(Continued)

FOREIGN PATENT DOCUMENTS

CN    105763628 A    7/2016
CN    108173952 A    6/2018
(Continued)

OTHER PUBLICATIONS

International Search Report for PCT/CN2023/082353, mailed May 30, 2023, 5 pages.
(Continued)

*Primary Examiner* — Clayton R Williams
(74) *Attorney, Agent, or Firm* — Astute IP Law Group

(57) ABSTRACT

The disclosure relates to a method, apparatus, electronic device and storage medium for scheduling for a content distribution network (CDN). The method includes: in response to an access request, received by an edge node, for a user to access a target website, determining whether target cache data corresponding to the target web site exists in the edge node; in response to absence of the target cache data in the edge node, reading address mapping data according to a load balancing strategy corresponding to the content delivery network; in response to determining that a target historical access network address corresponding to the target website exists in the address mapping data, determining a target edge address corresponding to the target historical access network address; and sending target cache data in the target edge address, corresponding to the target historical access network address to a user equipment through a cache service of the CDN.

20 Claims, 4 Drawing Sheets

(51) Int. Cl.
*H04L 47/125* (2022.01)
*H04L 61/25* (2022.01)

(56) References Cited

U.S. PATENT DOCUMENTS

| | | | | |
|---|---|---|---|---|
| 2011/0060798 A1* | 3/2011 | Cho | ............... | H04L 67/1031 |
| | | | | 709/206 |
| 2015/0058455 A1 | 2/2015 | Afergan et al. | | |
| 2019/0007522 A1 | 1/2019 | Satzke | | |
| 2020/0351344 A1* | 11/2020 | Das Gupta | ............ | H04L 41/16 |
| 2021/0400081 A1* | 12/2021 | van der Mandele | ............... | |
| | | | | H04L 63/1458 |

FOREIGN PATENT DOCUMENTS

| | | | |
|---|---|---|---|
| CN | 108234639 A | 6/2018 | |
| CN | 104660700 B | 2/2019 | |
| CN | 109951543 A | 6/2019 | |
| CN | 112256495 A | 1/2021 | |
| CN | 113873302 A | 12/2021 | |
| CN | 114466018 A | 5/2022 | |
| WO | 2019218441 A1 | 11/2019 | |
| WO | 2021004384 A1 | 1/2021 | |

OTHER PUBLICATIONS

Office Action for Chinese Patent Application No. 202210287989.3, mailed Dec. 13, 2023, 22 pages.
Extended European Search Report for European Patent Application No. 23773753.1, mailed on Apr. 28, 2025, 8 pages.

\* cited by examiner

SCHEDULING METHOD AND APPARATUS, STORAGE MEDIUM AND ELECTRONIC DEVICE FOR CONTENT DELIVERY NETWORK

CROSS-REFERENCE TO RELATED APPLICATIONS

This application is a continuation of International Patent Application No. PCT/CN2023/082353, filed on Mar. 17, 2023, which claims priority to Chinese Patent Application No. 202210287989.3, filed with the Chinese Patent Office on Mar. 22, 2022, and entitled "SCHEDULING METHOD AND APPARATUS, STORAGE MEDIUM AND ELECTRONIC DEVICE FOR CONTENT DELIVERY NETWORK", both of which are incorporated herein by reference in their entireties.

FIELD

The present disclosure relates to the field of computer network communication, and in particular, to a scheduling method and apparatus, a storage medium, an electronic device, a computer program and a computer program product for a content delivery network.

BACKGROUND

A content delivery network (CDN) is provided for adding a new network architecture in an existing interactive network, and release content data of a real source station to a nearest edge node of the CDN network, so that a user can obtain required content data nearby, thereby solving a network congestion condition and improving a response speed when a user accesses a website.

The CDN includes an edge node close to the user terminal and a parent layer node close to the real source station server. When there is no content data required by a user in an edge node, a request is sent to a parent layer node to request corresponding cache data; and when there is no cache data in the parent layer node either, a corresponding content data is requested to be obtained from a real source station. The frequent interaction between the edge node and the parent layer node increases the bandwidth from the edge to the parent layer, which increases the internal consumption cost of the CDN.

SUMMARY

This section is provided to introduce the concepts in a simplified form that are further described below in the Detailed Description. The content is not intended to identify key features or essential features of the claimed subject matters, nor is it intended to be used to limit the scope of protection of the claimed subject matter.

In a first aspect, the present disclosure provides a scheduling method for a content delivery network, including:
   in response to an access request, received by an edge node, for a user to access a target web site, determining whether target cache data corresponding to the target web site exists in the edge node;
   in response to absence of the target cache data in the edge node, reading address mapping data according to a load balancing strategy corresponding to the content delivery network, where a mapping relationship between an edge address and a historical access network address exists in the address mapping data;
   in response to determining that a target historical access network address corresponding to the target website exists in the address mapping data, determining a target edge address corresponding to the target historical access network address; and
   sending target cache data in the target edge address, corresponding to the target historical access network address to a user equipment through a cache service of the content distribution network.

In a second aspect, the present disclosure provides a scheduling apparatus for a content delivery network, and the apparatus includes:
   a first determining module configured to in response to an access request, received by an edge node, for a user to access a target web site, determine whether target cache data corresponding to the target web site exists in the edge node;
   a reading module configured to in response to absence of the target cache data in the edge node, read address mapping data according to a load balancing strategy corresponding to the content delivery network, where a mapping relationship between an edge address and a historical access network address exists in the address mapping data;
   a second determining module configured to determine, in response to determining that a target historical access network address corresponding to the target website exists in the address mapping data, a target edge address corresponding to the target historical access network address; and
   a sending module configured to send target cache data in the target edge address, corresponding to the target historical access network address to a user equipment through a cache service of the content distribution network.

In a third aspect, the present disclosure provides a computer readable medium, on which a computer program is stored. When being executed by a processing device, the computer program implements the steps of the method in the first aspect.

In a fourth aspect, the present disclosure provides an electronic device, including:
   a storage device having at least one computer program stored thereon;
   at least one processing device configured to execute the at least one computer program in the storage device, to implement the steps of the method in the first aspect.

In a fifth aspect, the present disclosure provides a computer program, where the computer program includes a program code executable by a processing device, and when the processing device executes the computer program, the processing device implements the steps of the method of the first aspect.

In a sixth aspect, the present disclosure provides a computer program product. The computer program product includes a computer program carried on a non-transitory computer readable medium. The computer program includes a program code executable by a processing device. When the processing device executes the computer program, the processing device implements the steps of a method according to the first aspect.

Other features and advantages of the disclosure will be set forth in the Detailed Description as follows.

BRIEF DESCRIPTION OF THE DRAWINGS

The above and other features, advantages, and aspects of various embodiments of the present disclosure will become more apparent with reference to the following Detailed Description in conjunction with the accompanying drawings. Throughout the drawings, the same or like reference numerals denote the same or like elements. It shall be understood that the drawings are illustrative and that components and elements may not be drawn to scale. In the drawings.

DETAILED DESCRIPTION

Figure 1:
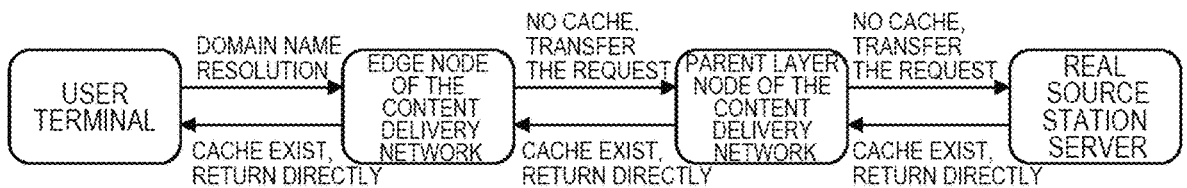
FIG. 1 is a flowchart of an access procedure of a content delivery network shown according to an exemplary embodiment.

Embodiments of the present disclosure will be described in more detail below with reference to the accompanying drawings. Although certain embodiments of the present disclosure are shown in the drawings, it should be understood that the present disclosure may be implemented in various forms and should not be construed as being limited to the embodiments set forth herein, but rather these embodiments are provided for a thorough and complete understanding of the present disclosure. It should be understood that the drawings and embodiments of the present disclosure are provided only for illustrative purposes and are not intended to limit the scope of protection of the present disclosure.

It should be understood that, the steps recorded in the method embodiments of the present disclosure may be executed in different orders, and/or executed in parallel. Furthermore, the method embodiments may include additional steps and/or the steps illustrated may be omitted. The scope of the present disclosure is not limited in this respect.

The names of messages or information interacted between a plurality of devices in the embodiments of the present disclosure are only for illustrative purposes, and are not intended to limit the scope of these messages or information.

FIG. 1 is flowchart of an access procedure of a content delivery network according to an exemplary embodiment. Referring to FIG. 1, in the current CDN server, the access procedure of the user requesting data is as follows: an internet user inputs a domain name to be accessed in a browser through a user terminal; the browser calls a domain name resolution library to resolve the domain name, so as to obtain a record of a Canonical Name (CNAME) corresponding to the domain name; in order to obtain an IP address (Internet Brief of the case Address) actually accessed, the browser needs to resolve the obtained CNAME domain name again; the corresponding CNAME is then resolved to an IP address by a global load balancing DNS resolution server from a CDN manufacturer; and after obtaining the IP address, the browser sends an access request to the CDN server.

After receiving the IP address, an edge node of the CDN determines whether corresponding cache data exists in the edge node, and if the cache data exists, the content is directly returned to the user terminal; and if the cache data does not exist, the request is transferred to a parent layer node through a scheduling strategy inside the cache service. If the corresponding cache data exists in the parent layer, the content is directly returned to the edge node; and if the cache data does not exist in the parent layer node, the request is sent to a real source station server according to a source station corresponding to the IP address, so as to request the corresponding content data. After obtaining the corresponding cache content from the source station server, on the one hand, the cache content is maintained in the cache servers of the parent layer node and the edge node, and on the other hand, the obtained cache data is returned to the user terminal to complete the data request service.

In an existing CDN access procedure, a CDN edge node needs to frequently interact with a CDN parent layer node when requesting data, and requests corresponding content data from a source station server through the parent layer node. Data interaction between the parent layer node and the edge node inside the CDN needs to occupy a bandwidth, and when the interaction is performed frequently, data transmission efficiency will be affected, and a significant internal loss will increase an internal cost of the CDN.

In view of this, embodiments of the present disclosure provide a scheduling method and an apparatus, a storage medium, an electronic device, a computer program and a computer program product for a content delivery network, to provide a new access procedure of the content delivery network, which includes determining whether cache data requested by a user exists in each edge node of the content delivery network by reading address mapping data, and scheduling the cache data requested by the user and sending the cache data to the user equipment from a target edge node where the corresponding cache data is stored according to a load balance strategy. Therefore, the interaction process between the edge node and the parent layer node in the content delivery network is reduced, and the internal consumption cost of the content delivery network is reduced.

Figure 2:
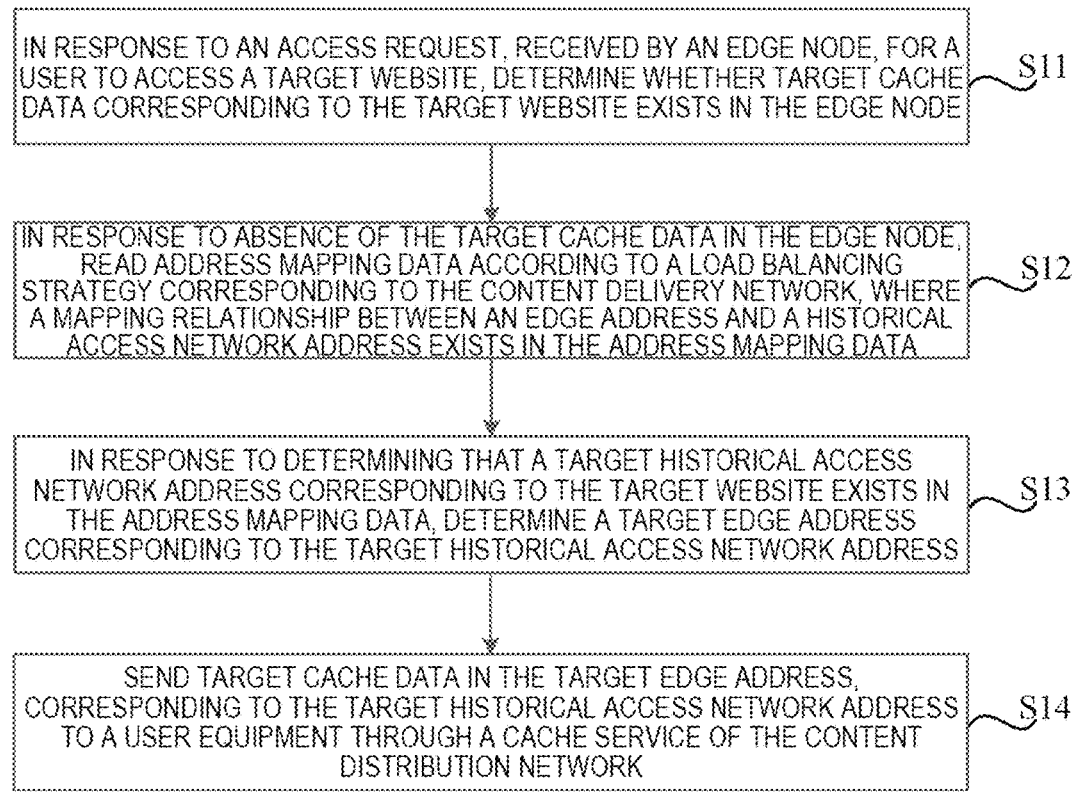
FIG. 2 is a flowchart illustrating a scheduling method for a content delivery network according to an exemplary embodiment.

FIG. 2 is a flowchart illustrating a scheduling method for a content delivery network according to an exemplary embodiment. Referring to FIG. 2, the scheduling method for a content delivery network includes the following steps:

At step S11, in response to an access request received by an edge node for a user to access a target website, it is determined whether target cache data corresponding to the target website exists in the edge node.

It should be noted that the content delivery network includes a plurality of edge nodes close to the user equipment and a parent layer node close to the source station server. When corresponding cache content (namely, target cache data) does not exist in the edge nodes, a data request is sent to the parent layer node; the parent layer node determines whether the cache content exists therein; and if not, the data request is sent to the source station server for requesting content data corresponding to the target website. The edge nodes are disposed at positions close to the user equipment, and the hierarchy of the edge nodes can be set according to practical requirements. For example, the setting may be performed according to provincial administrative district of a country, and 34 provincial edge nodes are set, each provincial edge node manages a data transmission request of a user in the province, and a parent layer node is disposed at a position close to the source station server, so as to more conveniently request content data from the source station server.

An edge node in the content distribution network receives an access request sent from a user equipment for accessing a target website, and the access request includes an IP address obtained by domain name resolution. The IP address in the access request is then identified, and whether cache data corresponding to the IP address is stored in a cache server of the edge node is determined.

At step S12, in response to absence of the target cache data in the edge node, address mapping data is read according to a load balancing strategy corresponding to the content delivery network, where a mapping relationship between an edge address and a historical access network address exists in the address mapping data.

It can be understood that when content data delivering is performed, as the edge node receives a corresponding request instruction for the first time, the cache data does not exist, and thus the edge node will request data from the parent layer node based on the corresponding request; after the parent layer node delivers data to the edge node, the content data will be sent to the corresponding edge node. Meanwhile, the edge node copies the content data to the corresponding cache server, so that when another user in the same region requests the same content data from the edge node, the corresponding cache data is directly sent to the user equipment. The parent layer node will record a correspondence between historical access requests and IP addresses of the edge node within a unit time period, and generate address mapping data. Within a unit time interval, the generated address mapping data is synchronized to respective edge nodes. For example, the time interval may be set to be 30 minutes, when primary synchronization is performed, all the address mapping data are sent to respective edge nodes, and after the synchronization is completed, incremental data in the parent layer node is sent to the edge nodes every 30 minutes.

After the edge node receives a new request instruction, when target cache data does not exist in the edge node, address mapping data is read according to a load balancing strategy of the content distribution network, and the address mapping data includes a mapping relationship between an edge address and a historical access network address. By looking up the address mapping data, it can be confirmed that the edge IP address corresponding to the target cache data requested by the user is stored. The load balance strategy corresponding to the content distribution network is a scheduling strategy which assigns loads to a plurality of operation units after balancing the loads. After determining that the corresponding target cache data does not exist in the edge node, the CDN is enabled to read the address mapping data first according to the load balancing strategy, and whether the corresponding target cache data exists in other edge IP addresses is determined. When the corresponding target cache data exists in another edge IP address, the cache data is called; and if the cache data does not exist, the request is sent to the parent layer node for performing corresponding data request.

Alternatively, in step S12, the address mapping data may be obtained by:
 querying an access log of a parent layer node in the content distribution network to obtain a correspondence between each edge address and a historical access network address;
 generating the address mapping data according to the correspondence; and
 sending the address mapping data to respective edge nodes.

During data interaction, an edge node sends a request to a parent layer node, and when there is no corresponding target cache data in the parent layer node, the request is sent to a source station server. Through the source station server, corresponding target cache data is distributed to an edge node, and at the same time, a correspondence between respective edge addresses and historical access network addresses will be recorded in an access log of the parent layer node. By querying the access log of the parent layer node of the CDN, the correspondence can be determined. The address mapping data is generated according to the correspondence, and the address mapping data is synchronized to each edge node within a predetermined time interval. For example, the address mapping data may be in a form of 1.1.1.1-www.ABC.com, where 1.1.1.1 is the IP address of the edge node, and www.ABC.com is the historical access network address corresponding to the edge node.

Figure 3:
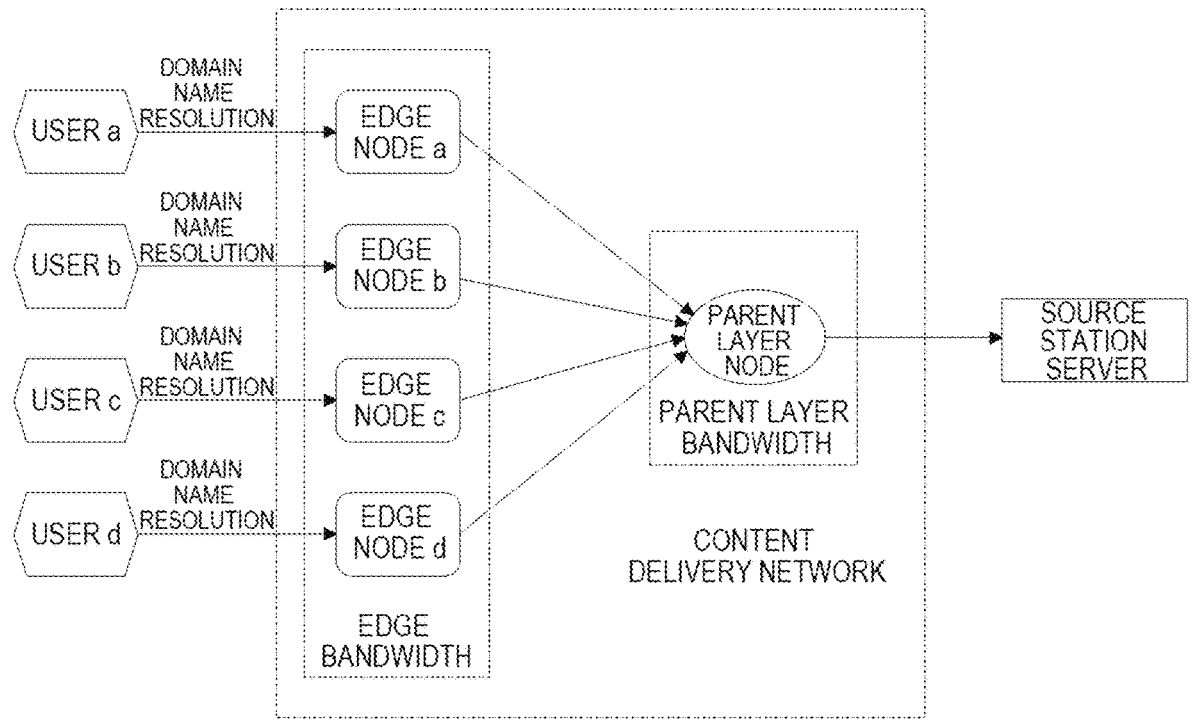
FIG. 3 is a flowchart illustrating another scheduling method for a content delivery network according to an exemplary embodiment.

FIG. 3 is another scheduling method for a content delivery network according to an exemplary embodiment. Referring to FIG. 3, the scheduling method further includes:
 in response to determining that the target historical access network address corresponding to the target website is absent in the address mapping data, sending the access request to a parent layer node in the content distribution network;
 in response to absence of the target cache data corresponding to the target website in the parent layer node, sending the access request to a source station server corresponding to the target web site; and
 in response to the target cache data sent by the source station server, storing the target cache data and sending the target cache data to the user equipment.

It can be understood that the address mapping data includes a correspondence between an edge IP address and a historical access network address; and when the content cache data requested by a user does not exist in the address mapping data, the CDN sends the data request from the corresponding edge node to the parent layer node based on the load balancing strategy. Whether corresponding content cache data exists in the parent layer node is determined; when the target cache data does not exist in the parent layer node, the data request is sent to a source station server; and the source station server calls corresponding target cache data according to the data request and sending the same to the CDN. After the CDN stores the target cache data in a cache unit of an edge node, the target cache data is sent to a user equipment via the edge node. For example, referring to FIG. 3, an edge node a, an edge node b, an edge node c and an edge node d are configured for receiving a user data request in the corresponding jurisdictions. When corresponding content cache data does not exist in respective nodes, the request is sent to the parent layer node; and when corresponding cache data does not exist in the parent layer node, the parent layer node transfers the request to the source station server.

Step S13: in response to determining that a target historical access network address corresponding to the target web site exists in the address mapping data, a target edge address corresponding to the target historical access network address is determined.

It can be understood that the address mapping data records a correspondence between a historical access network address and an edge IP address. If the corresponding target cache data does not exist in the edge node which has received a user data request, by comparing the IP address of the data requested by the user (namely, the IP address corresponding to the target website) with the historical access network address recorded in the address mapping data, it can be determined whether the target cache data exists in another edge nodes of the same CDN server. The target edge address corresponding to the target historical access network address is determined by the corresponding correspondence in the address mapping data.

Step S14: target cache data in the target edge address, corresponding to the target historical access network address is sent to a user equipment through a cache service of the content distribution network.

It can be understood that, after the target edge address is determined through the described steps, the scheduling of the target cache data corresponding to the edge address is realized through the cache server module of the CDN, and the target cache data in the target edge node is sent to the user equipment.

Figure 4:
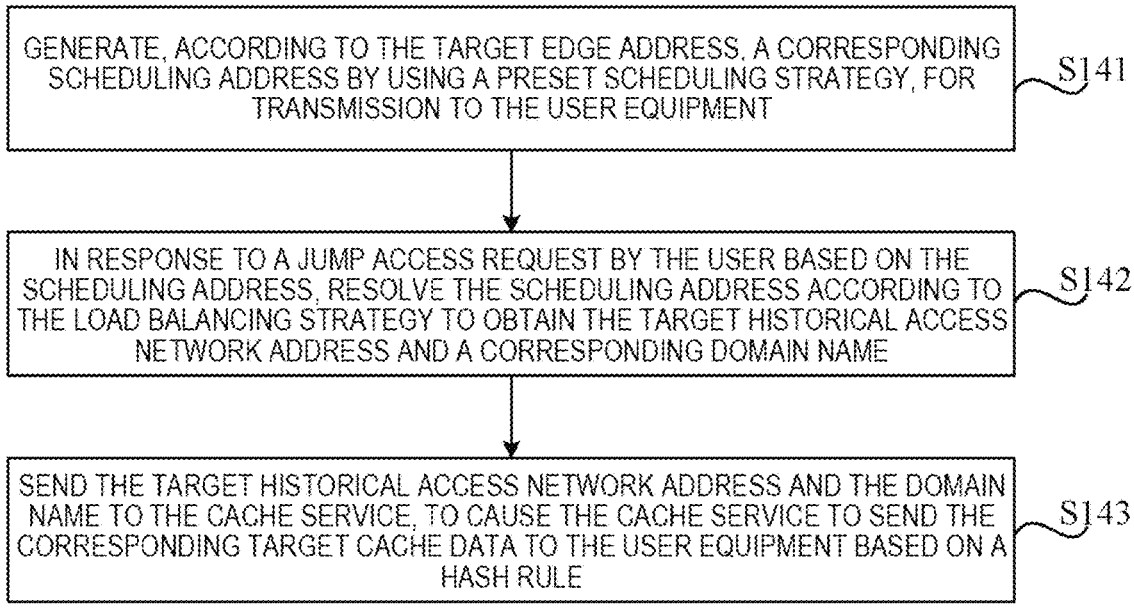
FIG. 4 is a flowchart illustrating a method for scheduling cache data according to an exemplary embodiment.

FIG. 4 is a flowchart of a method for scheduling cache data according to an exemplary embodiment. Referring to FIG. 4, step S14 described above includes:

At step S141, a corresponding scheduling address is generated according to the target edge address by using a predetermined scheduling strategy, and the corresponding scheduling address is sent to the user equipment;

At step S142, in response to a jump access request by the user based on the scheduling address, the scheduling address is resolved according to the load balancing strategy to obtain the target historical access network address and a corresponding domain name; and At step S143: the target historical access network address and the domain name are sent to the cache service to cause the cache service to send the corresponding target cache data to the user equipment based on a hash rule.

Figure 5:
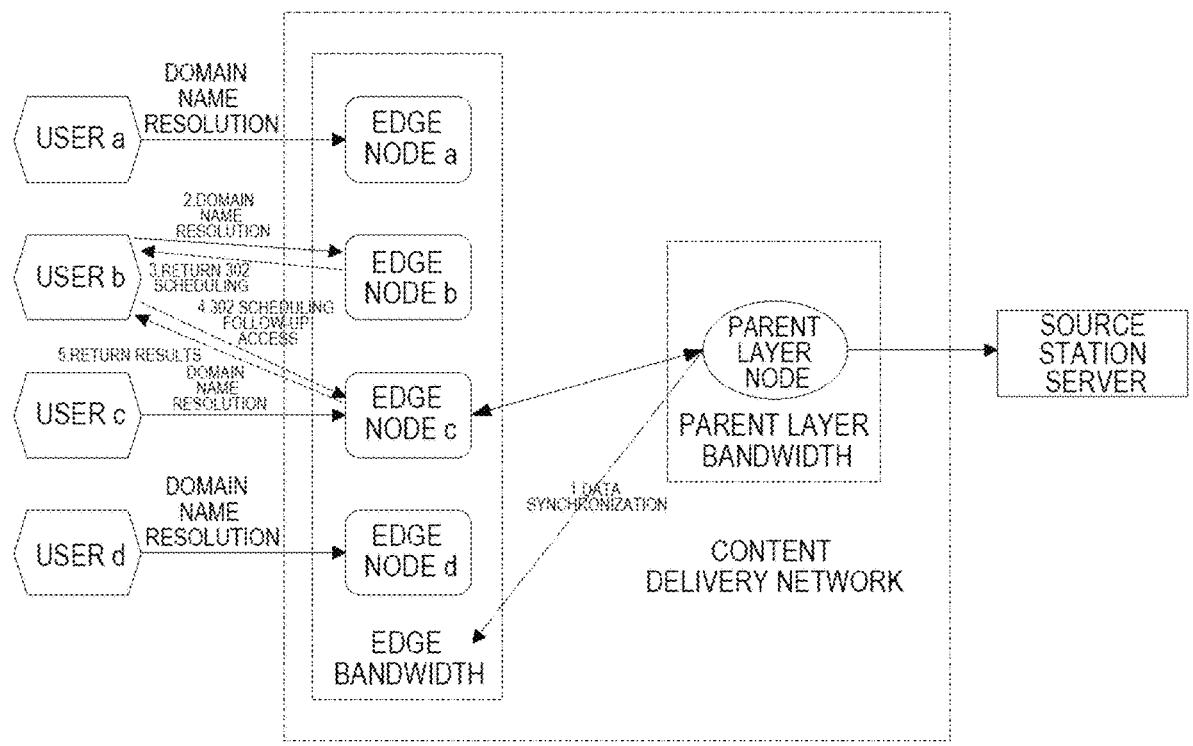
FIG. 5 is a flowchart illustrating another method for scheduling cache data according to an exemplary embodiment.

It can be understood that, in this embodiment, the edge node in the CDN is constituted of a seven-layer load balancing strategy and a cache server module. After obtaining the target edge address, the edge node that receives the user data access request generates a corresponding 302 scheduling address by using the seven-layer load balancing strategy, and returns the scheduling address to the user equipment. The 302 scheduling address includes a target edge address and a target request network address; and after receiving the 302 scheduling address, the user equipment performs jump access according to the edge address. After receiving a new access request, the edge node corresponding to the target edge address needs to resolve the access request according to the seven-layer load balancing strategy corresponding to the edge node, so as to obtain the target historical access network address and the corresponding domain name. The seven-layer load balancing strategy corresponding to the edge cache address sends the obtained target historical access network address and the corresponding domain name to the cache service according to the hash rule, then the cache service sends the stored target cache data to the seven-layer load balancing strategy of the edge node according to the hash rule, and then the seven-layer load balancing strategy sends the target cache data to the user equipment. For example, FIG. 5 is a schematic diagram of another method for scheduling cache data according to an exemplary embodiment. Referring to FIG. 5, edge nodes are divided through a provincial administrative division for managing data requests of users in each province, and in an initial state, when corresponding content cache data does not exist in an edge node c, the request is sent to the parent layer node, and the parent layer node sends a data request to a source station server. Meanwhile, the parent layer node generates address mapping data based on the IP address of the edge node c and the historical access network address corresponding to the content cache data, and then the address mapping data is synchronized to respective edge nodes. After obtaining the corresponding IP address through domain name resolution, the user equipment b may send the IP address to the edge node b of the CDN. After it is determined that the corresponding target cache data does not exist in the CDN edge node and it is queried that the IP address exists in the historical access network address of the address mapping data, a corresponding 302 scheduling instruction is returned to a the user equipment b; after reading the 302 scheduling instruction, the user equipment b sends a 302 scheduling follow-up access request to the edge node c (namely, a target edge address) according to the 302 scheduling instruction. After receiving the new access request, the edge node c returns the corresponding cache data (namely, the target cache data) to the user equipment b.

Alternatively, the scheduling method further includes:
determining a current access time according to the access request; and
in response to the current access time within a predetermined time range, determining to schedule the access request according to the predetermined scheduling strategy.

It can be understood that, in order to obtain more responses for data scheduling, more content cache data needs to be stored in respective edge nodes. Therefore, in the present embodiment, a corresponding predetermined scheduling strategy is started within a predetermined time range, and a data request is carried out of the predetermined time range according to a path from an edge node to a parent layer node and then to a source station server, so that more content cache data can be stored in the edge node, so that more scheduling responses can be obtained within the predetermined time range. For example, if there are more access requests from users during an evening peak period from 8 pm to 10 pm, correspondingly, a predetermined time range may be set to be the peak period from 8 pm to 10 pm to start the predetermined scheduling strategy, so as to relieve the data request pressure caused by the evening peak period, thus the user may obtain target cache data more fluently.

Alternatively, the scheduling method may further include:
determining a data volume of the target cache data; and
in response to the data volume being greater than a predetermined data volume threshold, determining to schedule the access request according to the predetermined scheduling strategy.

It can be understood that, for different content request instructions, response time of the CDN server is different. For example, the response time for an mp4 file is within 10-50 s, and the response time for web page data is within 1-2 s. In a process of a user sending a data request and obtaining corresponding target cache data from another edge node by using a predetermined scheduling strategy, extra time of 1-1.5 S needs to be added on the basis of the original data request time so as to complete scheduling of the responded data. For a relatively large file data request, such as a music file, a video file, etc., the response time of 1-1.5 s is added on the basis of an original response time, which will be obviously precepted by the user. However, for a relatively small file data request, such as web page data and picture data, the response time of 1-1.5 s is additionally added to an original response time of 1-2 s, which will be obviously precepted by the user and thus the user experience is easily influenced. Therefore, in this embodiment, a data volume of target cache data corresponding to a user is determined by a content data request sent by the user, and in the case where the data volume is greater than a predetermined data volume threshold, it is determined that data scheduling is performed according to a predetermined scheduling strategy. For example, the predetermined data volume threshold may be set as 50 M, and when the data volume of the target cache data is lower than 50 M, the corresponding content data request may not be scheduled, and when the data volume of the target cache data is higher than 50 M, the content data request is scheduled correspondingly according to the predetermined scheduling strategy.

Alternatively, the above step S141 includes:
obtaining a plurality of predetermined scheduling edge addresses in the content delivery network, allowed for cache data scheduling; and
in response to the target edge address being any one of the plurality of predetermined scheduling edge addresses, generating the corresponding scheduling address by using the predetermined scheduling strategy and sending the corresponding scheduling address to the user equipment.

It can be understood that the CDN may be divided according to the provincial levels, and each provincial edge node manages content data requests within its provincial range. Due to different performance and data bearing pressure of various edge node, when performing data scheduling, too large scheduling span will also lead to long data request time. Therefore, in this embodiment, data scheduling is only allowed to be performed on part of the edge nodes, and a predetermined scheduling edge address is set. When it is determined that the target edge address is one of the plurality of predetermined scheduling edge addresses, the corresponding scheduling address is generated by using the predetermined scheduling strategy and then sent to the user equipment, so that the data request is jumped to a corresponding edge node according to the scheduling address. For example, whether to perform scheduling according to a predetermined scheduling strategy may also be determined according to a set position of the edge node. For example, both an edge node a and an edge node b belong to a large area A, and when it is determined that the target edge address and the edge address receiving a data request belong to the same large area, data scheduling is allowed. If the edge node a belongs to the large area A, and the edge node c belongs to the large area B, a response delay will also be generated when a data request is performed across the large areas, and therefore data scheduling cannot be performed between the edge node a and the edge node c. The data request received by the edge node a obtains corresponding content cache data from the source station server via the path from the edge node to the parent layer node and then to the source station server.

According to the above technical solution, in response to an access request received by an edge node for a user to access a target website, it is determined whether target cache data corresponding to the target web site exists in the edge node; in a case where the target cache data does not exist in the edge node, the address mapping data is read according to a load balancing strategy corresponding to the content delivery network, where a mapping relationship between an edge address and a historical access network address exists in the address mapping data; when it is determined that a target historical access network address corresponding to the target website exists in the address mapping data, a target edge address corresponding to the target historical access network address is determined; and target cache data in the target edge address, corresponding to the target historical access network address is sent to a user equipment through a cache service of the content distribution network. In this way, by reading the address mapping data, whether cache data requested by the user exists in each edge node of the content delivery network is determined, and the cache data requested by the user is scheduled to be sent to the user equipment from a target edge node where the corresponding cache data is stored according to a load balancing strategy. Therefore, the interaction process between the edge node and the parent layer node in the content delivery network is removed, and the internal consumption cost of the content delivery network is reduced.

Figure 6:
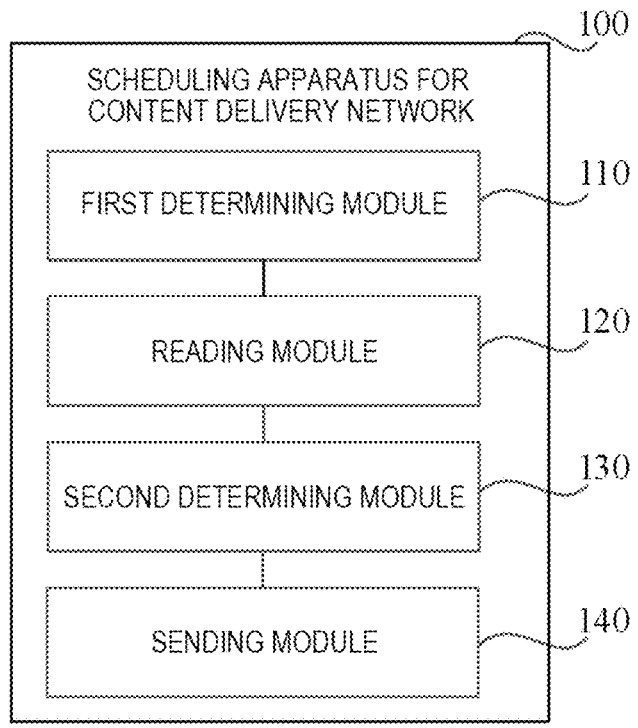
FIG. 6 is a block diagram illustrating a scheduling apparatus for a content delivery network according to an exemplary embodiment.

Based on the same concept, the present disclosure provides a scheduling apparatus for a content delivery network, which can be a part or all of an electronic device by means of software, hardware or a combination of the software and the hardware. FIG. 6 is a block diagram of a scheduling apparatus for a content delivery network according to an exemplary embodiment. Referring to FIG. 6, the scheduling apparatus for a content delivery network 100 includes:
a first determining module 110 configured to in response to an access request, received by an edge node, for a user to access a target website, determine whether target cache data corresponding to the target website exists in the edge node;
a reading module 120 configured to in response to absence of the target cache data in the edge node, read address mapping data according to a load balancing strategy corresponding to the content delivery network, where a mapping relationship between an edge address and a historical access network address exists in the address mapping data;
a second determining module 130 configured to in response to determining that a target historical access network address corresponding to the target website exists in the address mapping data, determine a target edge address corresponding to the target historical access network address; and
a sending module 140 configured to send target cache data in the target edge address, corresponding to the target historical access network address to a user equipment through a cache service of the content distribution network.

Alternatively, the sending module 140 may further include:
a first sending sub-module configured to generate, according to the target edge address, a corresponding scheduling address by using a predetermined scheduling strategy, and send the corresponding scheduling address to the user equipment;
an obtaining sub-module configured to, in response to a jump access request by the user based on the scheduling address, resolve the scheduling address according to the load balancing strategy to obtain the target historical access network address and a corresponding domain name; and
a second sending sub-module configured to send the target historical access network address and the domain name to the cache service, to cause the cache service to send the corresponding target cache data to the user equipment based on a hash rule.

Alternatively, the scheduling apparatus 100 includes a third determining module, where the third determining module is configured to:

determine a current access time according to the access request;

in response to the current access time within a predetermined time range, determine to schedule the access request according to the predetermined scheduling strategy.

Alternatively, the scheduling apparatus further includes a fourth determining module, where the fourth determining module is configured to:

determine a data volume of target cache data; and in response to the data volume being greater than a predetermined data volume threshold, determine to schedule the access request according to the predetermined scheduling strategy.

Alternatively, the first sending sub-module is configured to:

obtain a plurality of predetermined scheduling edge addresses in the content delivery network, allowed for cache data scheduling; and in response to the target edge address being any one of the plurality of predetermined scheduling edge addresses, generate the corresponding scheduling address by using the predetermined scheduling strategy, and send the corresponding scheduling address to the user equipment.

Alternatively, the scheduling apparatus 100 further includes a generating module, where the generating module is configured to:

query an access log of a parent layer node in the content distribution network, to obtain a correspondence between each edge address and a historical access network address;

generate the address mapping data according to the correspondence; and send the address mapping data to respective edge nodes.

Alternatively, the scheduling apparatus 100 may further include a transmission module, where the transmission module is configured to:

in response to determining that the target historical access network address corresponding to the target website is absent in the address mapping data, send the access request to a parent layer node in the content distribution network;

in response to absence of the target cache data corresponding to the target website in the parent layer node, send the access request to a source station server corresponding to the target web site; and in response to the target cache data sent by the source station server, store the target cache data and sending the target cache data to the user equipment.

With respect to the apparatus in the foregoing embodiments, the specific manner in which the modules execute the operations has been described in detail in the embodiments about the method, which will not be described in detail herein.

Based on the same concept, an embodiment of the present disclosure further provides a computer readable medium, on which a computer program is stored. When being executed by processing device, the computer program implements the steps of anyone of the above scheduling methods for a content delivery network.

Based on the same concept, an embodiment of the present disclosure further provides an electronic device, including:

a storage device having at least one computer program stored thereon;

at least one processing device configured to execute the at least one computer program in the storage device, to implement steps of the above scheduling method for a content delivery network.

Based on the same concept, the embodiments of the present disclosure further provide a computer program. The computer program includes a program code executable by a processing device. When the processing device executes the computer program, the processing device implements the steps of any of the above scheduling methods for a content delivery network.

Based on the same concept, an embodiment of the present disclosure further provides a computer program product. The computer program product includes a computer program carried on a non-transitory computer readable medium. The computer program includes a program code executable by a processing device. When the processing device executes the computer program, the processing device implements the steps of any of the above scheduling methods for a content delivery network.

Figure 7:
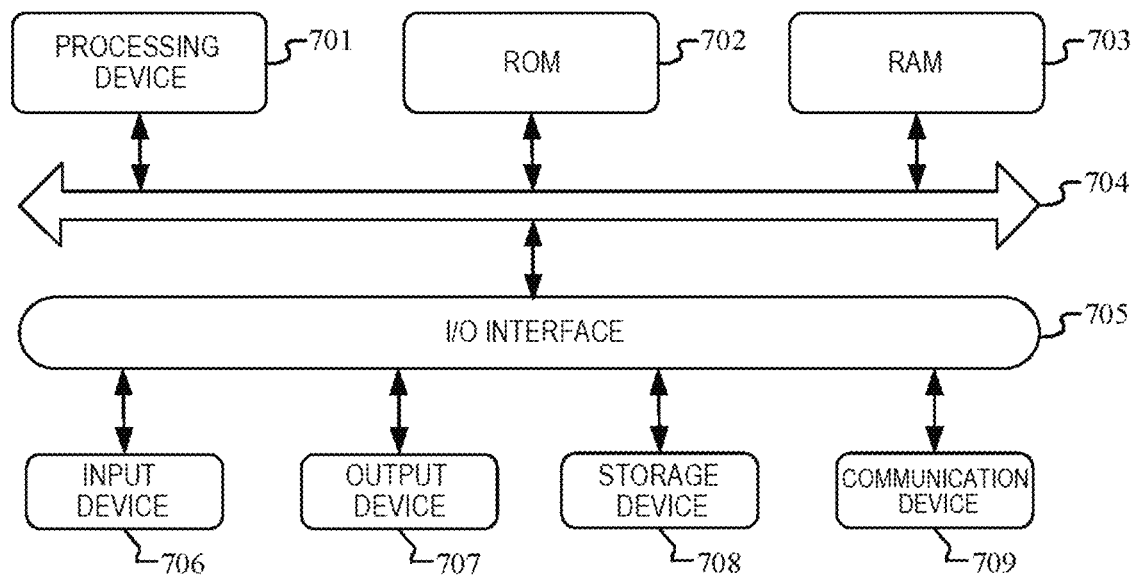
FIG. 7 is a block diagram illustrating an electronic device according to an exemplary embodiment.

Referring to FIG. 7 below, it is a structural schematic diagram of an electronic device 700 suitable for implementing the embodiment of the present disclosure. The terminal device in the embodiment of the present disclosure may include but is not limited to mobile terminals such as mobile phones, laptops, digital broadcast receivers, Personal Digital Assistants (PDAs), tablet computers (PADs), portable multimedia players (PMPs), car-mounted terminals (such as car navigation terminals), etc. and fixed terminals such as digital televisions (TV), desktop computers, etc. The electronic device shown in FIG. 7 is only an example and should not bring any limitation on the functionality and scope of use of the embodiment of the present disclosure.

As shown in FIG. 7, the electronic device 700 may include a processing device (such as a central processing unit, graphics processing unit, etc.) 701, which may perform various appropriate actions and processes based on programs stored in Read-Only Memory (ROM) 702 or loaded from storage device 708 into Random Access Memory (RAM) 703. In the RAM 703, various programs and data necessary for the operation of the electronic device 700 are also stored. The processing device 701, ROM 702, and RAM 703 are connected to each other through a bus 704. An Input/Output I/O interface 705 is also connected to the bus 704.

Typically, the following devices can be connected to I/O interface 705: input devices 706 including, for example, touch screens, touchpads, keyboards, mice, cameras, microphones, accelerometers, gyroscopes, etc.; output devices 707 including liquid crystal displays (LCDs), speakers, vibrators, etc.; storage devices 708 including magnetic tapes, hard disks, etc.; and a communication device 709. The communication device 709 may allow the electronic device 700 to communicate with other devices wirelessly or wirelessly to exchange data. Although FIG. 7 shows an electronic device 700 with a plurality of devices, it shall be understood that it is not required to implement or have all of the devices shown. More or fewer devices can be implemented or provided instead.

In particular, according to embodiments of the present disclosure, the process described above with reference to the flowchart can be implemented as a computer software program. For example, an embodiment of the present disclosure includes a computer program product that includes a computer program carried on a non-transitory computer-readable medium, where the computer program includes program code for performing the method shown in the flowchart. In such an embodiment, the computer program can be downloaded and installed from a network through the communication device 709, or installed from the storage device 708, or installed from the ROM 702. When the computer program is executed by the processing device 701, the above functions defined in the method of the embodiment of the present disclosure are performed.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. More specific examples of the computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or send programs for use by or in conjunction with instruction execution systems, apparatus, or devices. The program code contained on the computer-readable medium may be sent using any suitable medium, including but not limited to: wires, optical cables, radio frequency (RF), etc., or any suitable combination thereof.

In some embodiments, clients and servers can communicate using any currently known or future developed network protocol such as HTTP (HyperText Transfer Protocol), and can be interconnected with any form or medium of digital data communication (such as communication networks). Examples of communication networks include local area networks (LANs), wide area networks (WANs), internetworks (such as the Internet), and end-to-end networks (such as ad hoc end-to-end networks), as well as any currently known or future developed networks.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device: in response to an access request, received by an edge node, for a user to access a target website, determines whether target cache data corresponding to the target website exists in the edge node; in response to absence of the target cache data in the edge node, reads address mapping data according to a load balancing strategy corresponding to the content delivery network, where a mapping relationship between an edge address and a historical access network address exists in the address mapping data; in response to determining that a target historical access network address corresponding to the target website exists in the address mapping data, determine a target edge address corresponding to the target historical access network address; and send target cache data in the target edge address, corresponding to the target historical access network address to a user equipment through a cache service of the content distribution network.

Computer program codes for performing the operations of the present disclosure may be written in one or more programming languages or a combination thereof, including but not limited to Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including local area network (LAN) or wide area network (WAN)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The modules described in the embodiments of the present disclosure may be implemented by means of software or hardware, and the name of the module does not constitute a limitation on the module itself in a certain case, for example, a first obtaining module may also be described as "a module for obtaining at least two internet protocol addresses".

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. More specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, example 1 provides a scheduling method for a content delivery network, the method including:
  in response to an access request, received by an edge node, for a user to access a target web site, determining whether target cache data corresponding to the target web site exists in the edge node;
  in response to absence of the target cache data in the edge node, reading address mapping data according to a load balancing strategy corresponding to the content delivery network, where a mapping relationship between an edge address and a historical access network address exists in the address mapping data;
  in response to determining that a target historical access network address corresponding to the target website exists in the address mapping data, determining a target edge address corresponding to the target historical access network address; and
  sending target cache data in the target edge address, corresponding to the target historical access network address to a user equipment through a cache service of the content distribution network.

According to one or more embodiments of the present disclosure, example 2 provides the method of example 1, and sending the target cache data in the target edge address, corresponding to the target historical access network address to the user equipment by the cache service of the content distribution network includes:
  generating, according to the target edge address, a corresponding scheduling address by using a predetermined scheduling strategy, and sending the corresponding scheduling address to the user equipment;
  in response to a jump access request by the user based on the scheduling address, resolving the scheduling address according to the load balancing strategy to obtain the target historical access network address and a corresponding domain name; and
  sending the target historical access network address and the domain name to the cache service, to cause the cache service to send the corresponding target cache data to the user equipment based on a hash rule.

According to one or more embodiments of the present disclosure, example 3 provides a method of example 2, and the method further includes:
  determining a current access time according to the access request; and
  in response to the current access time within a predetermined time range, determining to schedule the access request according to the predetermined scheduling strategy.

According to one or more embodiments of the present disclosure, example 4 provides the method of example 2, and the method further includes:
  determining a data volume of the target cache data; and
  in response to the data volume being greater than a predetermined data volume threshold, determining to schedule the access request according to the predetermined scheduling strategy.

According to one or more embodiments of the present disclosure, example 5 provides the method of example 2, where generating, according to the target edge address, the corresponding scheduling address by using the predetermined scheduling strategy, and sending the corresponding scheduling address to the user equipment includes:
  obtaining a plurality of predetermined scheduling edge addresses in the content delivery network, allowed for cache data scheduling; and
  in response to the target edge address being any one of the plurality of predetermined scheduling edge addresses, generating the corresponding scheduling address by using the predetermined scheduling strategy and sending the corresponding scheduling address to the user equipment.

According to one or more embodiments of the present disclosure, example 6 provides the method of any of examples 1 to 5, the address mapping data is obtained by:
  querying an access log of a parent layer node in the content distribution network to obtain a correspondence between each edge address and a historical access network address;
  generating the address mapping data according to the correspondence; and
  sending the address mapping data to respective edge nodes.

According to one or more embodiments of the present disclosure, example 7 provides the method of example 6, the scheduling method for a content delivery network further including:
  in response to determining that the target historical access network address corresponding to the target website is absent in the address mapping data, sending the access request to a parent layer node in the content distribution network;
  in response to absence of the target cache data corresponding to the target web site in the parent layer node, sending the access request to a source station server corresponding to the target web site; and
  in response to the target cache data sent by the source station server, storing the target cache data and sending the target cache data to the user equipment.

According to one or more embodiments of the present disclosure, example 8 provides a scheduling apparatus for a content delivery network, and the scheduling apparatus for a content delivery network includes:
  a first determining module configured to in response to an access request, received by an edge node, for a user to access a target web site, determine whether target cache data corresponding to the target website exists in the edge node;
  a reading module configured to in response to absence of the target cache data in the edge node, read address mapping data according to a load balancing strategy corresponding to the content delivery network, where a mapping relationship between an edge address and a historical access network address exists in the address mapping data;
  a second determining module configured to in response to determining that a target historical access network address corresponding to the target website exists in the address mapping data, determine a target edge address corresponding to the target historical access network address; and a sending module configured to send target cache data in the target edge address, corresponding to the target historical access network address to a user equipment through a cache service of the content distribution network.

According to one or more embodiments of the present disclosure, example 9 provides the apparatus of Example 8, and the sending module may further include:

a first sending sub-module configured to generate, according to the target edge address, a corresponding scheduling address by using a predetermined scheduling strategy, and sending the corresponding scheduling address to the user equipment;

an obtaining sub-module configured to, in response to a jump access request by the user based on the scheduling address, resolving the scheduling address according to the load balancing strategy to obtain the target historical access network address and a corresponding domain name; and a second sending sub-module configured to send the target historical access network address and the domain name to the cache service, to cause the cache service to send the corresponding target cache data to the user equipment based on a hash rule.

According to one or more embodiments of the present disclosure, example 10 provides the apparatus of example 9, the scheduling apparatus includes a third determining module configured to:

determine a current access time according to the access request; and in response to the current access time within a predetermined time range, determine to schedule the access request according to the predetermined scheduling strategy.

According to one or more embodiments of the present disclosure, example 11 provides the apparatus of example 9, and the scheduling apparatus further includes a fourth determining module, the fourth determining module configured to:

determine a data volume of target cache data; and in response to the data volume being greater than a predetermined data volume threshold, determine to schedule the access request according to the predetermined scheduling strategy.

According to one or more embodiments of the present disclosure, example 12 provides the apparatus of example 9, including a first sending sub-module configured to:

obtain a plurality of predetermined scheduling edge addresses in the content delivery network, allowed for cache data scheduling; and in response to the target edge address being any one of the plurality of predetermined scheduling edge addresses, generate the corresponding scheduling address by using the predetermined scheduling strategy and send the corresponding scheduling address to the user equipment.

According to one or more embodiments of the present disclosure, example 13 provides the apparatus of any of examples 8-12, the scheduling apparatus further includes a generating module, the generating module configured to:

query an access log of a parent layer node in the content distribution network, to obtain a correspondence between each edge address and a historical access network address;

generate the address mapping data according to the correspondence; and send the address mapping data to respective edge nodes.

According to one or more embodiments of the present disclosure, example 14 provides the apparatus of example 13, further including a transmission module to:

in response to determining that the target historical access network address corresponding to the target website is absent in the address mapping data, sending the access request to a parent layer node in the content distribution network;

in response to absence of the target cache data corresponding to the target web site in the parent layer node, sending the access request to a source station server corresponding to the target web site; and in response to the target cache data sent by the source station server, storing the target cache data and sending the target cache data to the user equipment.

According to one or more embodiments of the present disclosure, example 15 provides a computer readable medium, on which a computer program is stored, where when being executed by a processing device, the computer program implements the steps of a method according to any one of Examples 1 to 7.

According to one or more embodiments of the present disclosure, example 16 provides an electronic device, including:

a storage device having at least one computer program stored thereon;

at least one processing device configured to execute the at least one computer program in the storage device, to implement the steps of a method according to any one of examples 1 to 7.

According to one or more embodiments of the present disclosure, example 17 provides a computer program, the computer program including a program code executable by a processing device, the processing device, when executing the computer program, implementing the steps of the method of any of examples 1-7.

According to one or more embodiments of the present disclosure, example 18 provides a computer program product, the computer program product includes a computer program carried on a non-transitory computer readable medium, the computer program including a program code executable by a processing device, and when the processing device executes the computer program, the processing device implements the steps of the method of any one of examples 1-7.

The foregoing description is merely illustration of the preferred embodiments of the present disclosure and the technical principles applied thereto, as will be appreciated by those skilled in the art, the disclosure of the present disclosure is not limited to the technical solution formed by the specific combination of the described technical features, At the same time, it should also cover other technical solutions formed by any combination of the described technical features or equivalent features thereof without departing from the described disclosed concept. For example, the above features and technical features having similar functions disclosed in the present disclosure (but not limited thereto) are replaced with each other to form a technical solution.

In addition, while operations are depicted in a particular order, this should not be understood as requiring the operations be performed in the particular order shown or in sequential order. Multitasking and parallel processing may be advantageous in certain circumstances. Likewise, while several specific implementation details are included in the above discussion, these should not be construed as limiting the scope of the present disclosure. Certain features that are described in the context of individual embodiments can also be implemented in combination in a single embodiment. Conversely, various features that are described in the context of a single embodiment can also be implemented in a plurality of embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims. As the specific manner in which the modules execute the operations has been described in detail in the embodiments of the method, the apparatus in the foregoing embodiments will not be described in detail herein.

What is claimed is:

1. A scheduling method for a content delivery network, comprising:
    in response to an access request, received by an edge node, for a user to access a target website, determining whether target cache data corresponding to the target website exists in the edge node;
    in response to absence of the target cache data in the edge node, reading address mapping data according to a load balancing strategy corresponding to the content delivery network, wherein a mapping relationship between an edge address and a historical access network address exists in the address mapping data;
    in response to determining that a target historical access network address corresponding to the target website exists in the address mapping data, determining a target edge address corresponding to the target historical access network address; and
    sending target cache data in the target edge address, corresponding to the target historical access network address, to a user equipment through a cache service of the content distribution network.

2. The scheduling method of claim 1, wherein sending the target cache data in the target edge address, corresponding to the target historical access network address to the user equipment by the cache service of the content distribution network comprises:
    generating, according to the target edge address, a corresponding scheduling address by using a predetermined scheduling strategy, and sending the corresponding scheduling address to the user equipment;
    in response to a jump access request by the user based on the scheduling address, resolving the scheduling address according to the load balancing strategy to obtain the target historical access network address and a corresponding domain name; and
    sending the target historical access network address and the domain name to the cache service, to cause the cache service to send the corresponding target cache data to the user equipment based on a hash rule.

3. The scheduling method of claim 2, further comprising:
    determining a current access time according to the access request; and
    in response to the current access time within a predetermined time range, determining to schedule the access request according to the predetermined scheduling strategy.

4. The scheduling method of claim 2, further comprising:
    determining a data volume of the target cache data, and
    in response to the data volume being greater than a predetermined data volume threshold, determining to schedule the access request according to the predetermined scheduling strategy.

5. The scheduling method of claim 2, wherein generating, according to the target edge address, the corresponding scheduling address by using the predetermined scheduling strategy, and sending the corresponding scheduling address to the user equipment comprises:
    obtaining a plurality of predetermined scheduling edge addresses in the content delivery network, allowed for cache data scheduling; and
    in response to the target edge address being any one of the plurality of predetermined scheduling edge addresses, generating the corresponding scheduling address by using the predetermined scheduling strategy, and sending the corresponding scheduling address to the user equipment.

6. The scheduling method of claim 1, wherein the address mapping data is obtained by:
    querying an access log of a parent layer node in the content distribution network to obtain a correspondence between each edge address and a historical access network address;
    generating the address mapping data according to the correspondence; and
    sending the address mapping data to respective edge nodes.

7. The scheduling method of claim 1, further comprising:
    in response to determining that the target historical access network address corresponding to the target website is absent in the address mapping data, sending the access request to a parent layer node in the content distribution network;
    in response to absence of the target cache data corresponding to the target website in the parent layer node, sending the access request to a source station server corresponding to the target website; and
    in response to the target cache data sent by the source station server, storing the target cache data and sending the target cache data to the user equipment.

8. An electronic device, comprising:
    a storage device having at least one computer program stored thereon;
    at least one processing device configured to execute the at least one computer program in the storage device, to implement actions comprising:
    in response to an access request, received by an edge node, for a user to access a target website, determining whether target cache data corresponding to the target website exists in the edge node;
    in response to absence of the target cache data in the edge node, reading address mapping data according to a load balancing strategy corresponding to the content delivery network, wherein a mapping relationship between an edge address and a historical access network address exists in the address mapping data;
    in response to determining that a target historical access network address corresponding to the target website exists in the address mapping data, determining a target edge address corresponding to the target historical access network address; and
    sending target cache data in the target edge address, corresponding to the target historical access network address, to a user equipment through a cache service of the content distribution network.

9. The electronic device of claim 8, wherein sending the target cache data in the target edge address, corresponding to the target historical access network address to the user equipment by the cache service of the content distribution network comprises:
generating, according to the target edge address, a corresponding scheduling address by using a predetermined scheduling strategy, and sending the corresponding scheduling address to the user equipment;
in response to a jump access request by the user based on the scheduling address, resolving the scheduling address according to the load balancing strategy to obtain the target historical access network address and a corresponding domain name; and
sending the target historical access network address and the domain name to the cache service, to cause the cache service to send the corresponding target cache data to the user equipment based on a hash rule.

10. The electronic device of claim 9, wherein the acts further comprise:
determining a current access time according to the access request; and
in response to the current access time within a predetermined time range, determining to schedule the access request according to the predetermined scheduling strategy.

11. The electronic device of claim 9, wherein the acts further comprise:
determining a data volume of the target cache data; and
in response to the data volume being greater than a predetermined data volume threshold, determining to schedule the access request according to the predetermined scheduling strategy.

12. The electronic device of claim 9, wherein generating, according to the target edge address, the corresponding scheduling address by using the predetermined scheduling strategy, and sending the corresponding scheduling address to the user equipment comprises:
obtaining a plurality of predetermined scheduling edge addresses in the content delivery network, allowed for cache data scheduling; and
in response to the target edge address being any one of the plurality of predetermined scheduling edge addresses, generating the corresponding scheduling address by using the predetermined scheduling strategy, and sending the corresponding scheduling address to the user equipment.

13. The electronic device of claim 8, wherein the address mapping data is obtained by:
querying an access log of a parent layer node in the content distribution network to obtain a correspondence between each edge address and a historical access network address;
generating the address mapping data according to the correspondence; and
sending the address mapping data to respective edge nodes.

14. The electronic device of claim 8, wherein the acts further comprise:
in response to determining that the target historical access network address corresponding to the target website is absent in the address mapping data, sending the access request to a parent layer node in the content distribution network;
in response to absence of the target cache data corresponding to the target website in the parent layer node, sending the access request to a source station server corresponding to the target website; and
in response to the target cache data sent by the source station server, storing the target cache data and sending the target cache data to the user equipment.

15. A non-transitory computer readable medium storing a computer program thereon, the computer program, when being executed by a processing device, implementing acts comprising:
in response to an access request, received by an edge node, for a user to access a target website, determining whether target cache data corresponding to the target website exists in the edge node;
in response to absence of the target cache data in the edge node, reading address mapping data according to a load balancing strategy corresponding to the content delivery network, wherein a mapping relationship between an edge address and a historical access network address exists in the address mapping data;
in response to determining that a target historical access network address corresponding to the target website exists in the address mapping data, determining a target edge address corresponding to the target historical access network address; and
sending target cache data in the target edge address, corresponding to the target historical access network address, to a user equipment through a cache service of the content distribution network.

16. The non-transitory computer readable medium of claim 15, wherein sending the target cache data in the target edge address, corresponding to the target historical access network address to the user equipment by the cache service of the content distribution network comprises:
generating, according to the target edge address, a corresponding scheduling address by using a predetermined scheduling strategy, and sending the corresponding scheduling address to the user equipment;
in response to a jump access request by the user based on the scheduling address, resolving the scheduling address according to the load balancing strategy to obtain the target historical access network address and a corresponding domain name; and
sending the target historical access network address and the domain name to the cache service, to cause the cache service to send the corresponding target cache data to the user equipment based on a hash rule.

17. The non-transitory computer readable medium of claim 16, wherein the acts further comprise:
determining a current access time according to the access request; and
in response to the current access time within a predetermined time range, determining to schedule the access request according to the predetermined scheduling strategy.

18. The non-transitory computer readable medium of claim 16, wherein the acts further comprise:
determining a data volume of the target cache data; and
in response to the data volume being greater than a predetermined data volume threshold, determining to schedule the access request according to the predetermined scheduling strategy.

19. The non-transitory computer readable medium of claim 16, wherein generating, according to the target edge address, the corresponding scheduling address by using the predetermined scheduling strategy, and sending the corresponding scheduling address to the user equipment comprises:
  obtaining a plurality of predetermined scheduling edge addresses in the content delivery network, allowed for cache data scheduling; and
  in response to the target edge address being any one of the plurality of predetermined scheduling edge addresses, generating the corresponding scheduling address by using the predetermined scheduling strategy, and sending the corresponding scheduling address to the user equipment.

20. The non-transitory computer readable medium of claim 15, wherein the address mapping data is obtained by:
  querying an access log of a parent layer node in the content distribution network to obtain a correspondence between each edge address and a historical access network address;
  generating the address mapping data according to the correspondence; and
  sending the address mapping data to respective edge nodes.

* * * * *